Sept. 6, 1932. W. E. MacMONAGLE 1,876,309
APPARATUS FOR REMOVING PLASTIC MATERIAL FROM MILLS
Filed Nov. 30, 1928 3 Sheets-Sheet 1
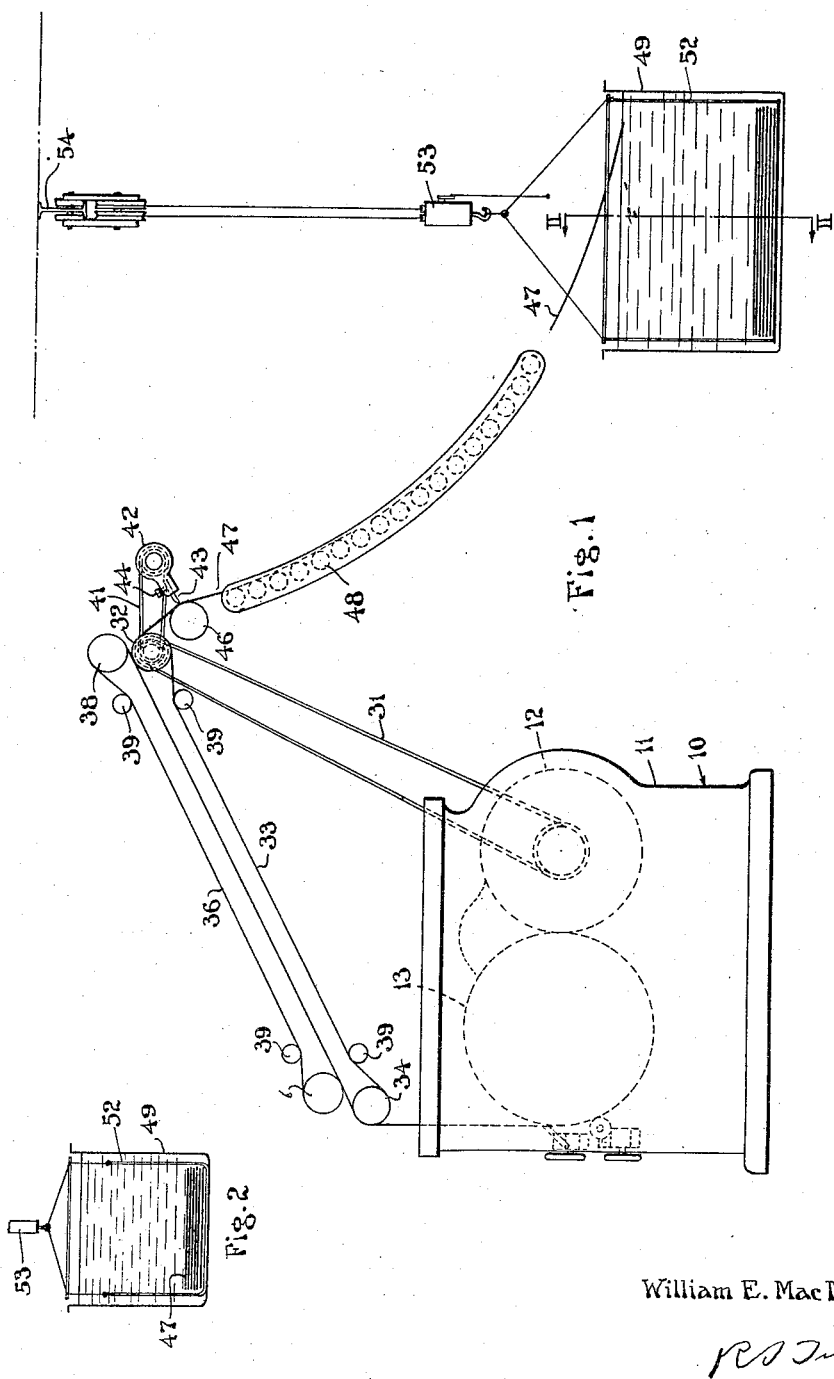
Inventor
William E. MacMonagle
By
Attorney

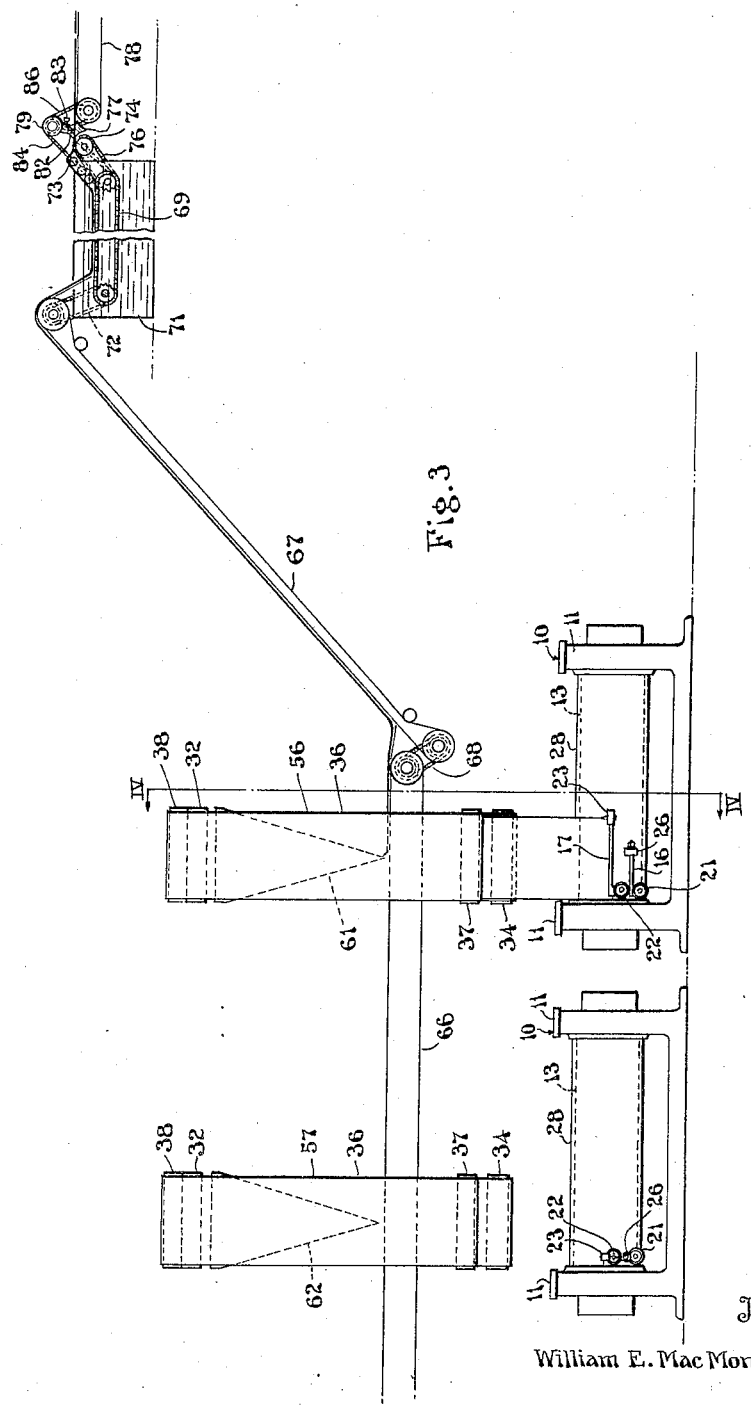

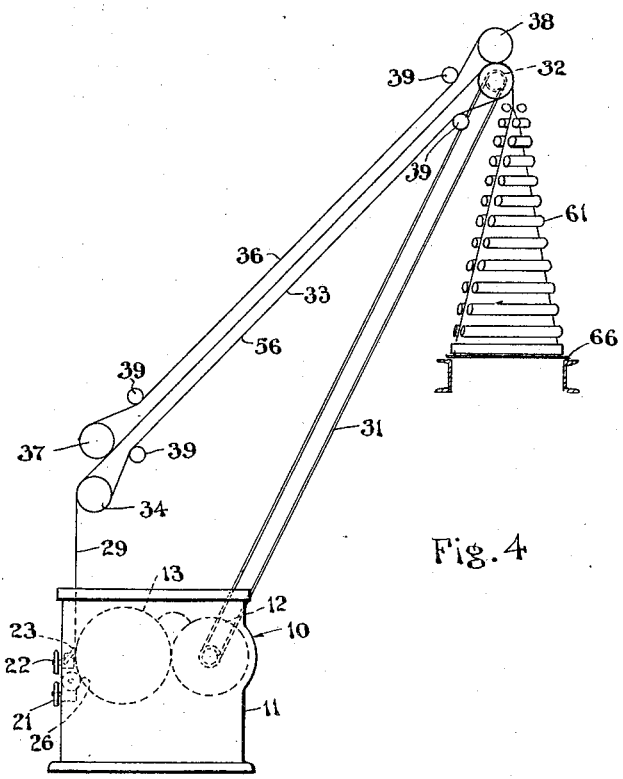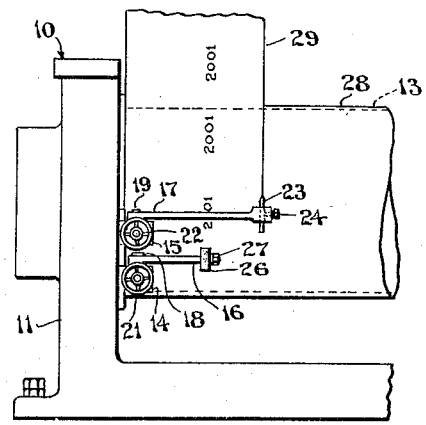

Patented Sept. 6, 1932

1,876,309

UNITED STATES PATENT OFFICE

WILLIAM E. MacMONAGLE, OF AKRON, OHIO, ASSIGNOR TO THE GOODYEAR TIRE & RUBBER COMPANY, OF AKRON, OHIO, A CORPORATION OF OHIO

APPARATUS FOR REMOVING PLASTIC MATERIAL FROM MILLS

Application filed November 30, 1928. Serial No. 322,761.

This invention relates to apparatus for manipulating plastic material and has particular relation to apparatus of the above designated character for removing rubber stock from mixing or warming mills.

An object of the invention is to provide apparatus for removing plastic material from mills more economically than has been possible by the methods and apparatus employed heretofore.

Another object of the invention is to provide apparatus for removing plastic material from mills mechanically.

Another object of the invention is to provide apparatus for removing plastic material from mills in such manner that the production capacity of the mills will be greatly increased.

Heretofore a method employed generally in removing plastic material from mills consisted of a plurality of manual operations which were performed successively by a mill attendant. After a batch of stock had been mixed or kneaded in a mill for a predetermined length of time, the attendant, with the aid of a knife, cut the stock from one of the rolls of the mills in large slabs, generally of a rectangular shape. After removing each slab from the mill, the attendant marked a serial number indicating the compounding formula of such stock upon it with a piece of chalk and thereafter dipped the slab in a bath of cooling water also containing soapstone or other anti-friction material in suspension therein. Thereafter, the slab was placed upon a stock truck to be transported elsewhere when the truck was completely loaded. Obviously, a very substantial period of time was required, for marking, soapstoning, cooling and placing a slab of stock upon the truck, before the next slab could be severed from the mill. The first slab could not be removed from the mill until such time as the entire batch of stock was in condition to be removed. Consequently, all of the time consumed in removing the batch of stock from the mill was consumed in overmixing the batch. Hence, during such period of time the mill was inoperative for the purpose of performing its primary function of mixing plastic material because of the fact that another batch could not be placed therein immediately after the time, required in mixing the former, had expired.

By the apparatus for removing plastic material from mills embodying this invention, an entire batch of material is removed from a roll of the mill in a continuous strip which is marked with the compound number, divided into slabs of predetermined length, impregnated with anti-friction material and cooled, as a complete series of operations performed simultaneously while the strip is being removed. Obviously, by the apparatus of the present invention, the time heretofore required for removing a batch of stock from a mill is greatly shortened and the mill can be employed for mixing succeeding batches at much shorter intervals than has been possible heretofore. Thus, by employing such apparatus, it is possible to increase the production capacity of any mill room materially without a proportional increase in the number of mills employed therein.

For a better understanding of the invention, reference may now be had to the accompanying drawings, forming a part of the specification, in which:

Fig. 1 is a diagrammatical side elevational view of one form of an apparatus for practicing the aforesaid invention;

Fig. 2 is a fragmentary cross-sectional view taken substantially on line II—II of Fig. 1;

Fig. 3 is a diagrammatical elevational view of another form of apparatus for practicing the invention;

Fig. 4 is a cross-sectional view taken substantially on line IV—IV of Fig. 3; and Fig. 5 is an enlarged fragmentary view of a mill provided with apparatus embodying the invention.

Referring more particularly to Fig. 1, a mill 10 comprises a pair of spaced frames 11 between which mill rolls 12 and 13 are rotatably mounted. The rolls 12 and 13 are rotatably driven in a well known manner by intermeshing gears, suitable transmission apparatus and a motor (not shown). The mill 10 (see Fig. 5) also is provided with a pair of brackets 14 and 15 rigidly secured to one of the frame members 11 adjacent the roll 13, which are adapted pivotally to support arms 16 and 17 upon pins 18 and 19 projecting within the brackets 14 and 15 respectively. The brackets 14 and 15 also are provided with hand wheels 21 and 22 respectively adapted to be employed for tightening the brackets 14 and 15 upon the pins 18 and 19 in order rigidly to secure the arms 16 and 17 in predetermined relation to the roll 13.

The arm 17, which is slightly longer than the arm 16, is provided, adjacent its outer end, with a blade 23, which is adjustably secured therein by a set screw 24. The arm 16 is provided with a journaled portion adjacent its outer end for rotatably receiving a disc 26, which is provided around its periphery with relief figures or indicia designating the compounding formula of a batch of stock. When such batch is ready to be removed from the mill, the hand wheels 21 and 22 and the arms 16 and 17 are so manipulated that the blade 23 projects substantially through a sheet of plastic material 28 upon the roll 13 and severs a strip of material 29 therefrom while the roller 26 tangently engages the sheet 28 and so deforms the surface thereof as to reproduce the indicia of the disc 26 within the surface of the strip.

A chain 31, which is driven by the roll 12 of the mill 10, in turn drives a roller 32 supporting one end of an inclined conveyor 33, having its opposite extremity supported by a roller 34 located immediately above the strip 29. A second conveyor 36, engaging the upper reach of the conveyor 33, is supported rotatably at opposite ends by idling rollers 37 and 38. Belt tightening rollers 39 engage the outer reaches of the belts 33 and 36 adjacent the opposite ends thereof. The strip 29 is placed in operative relation to the conveyors 33 and 36 manually and is transported continuously thereby from the roll 13. The roller 32 also drives a chain 41 which, in turn, drives a rotatable cutting mechanism 42 having an elongate blade 43 adjustably secured therein by a plurality of screws 44. The strip 29 is adapted to project between the cutting edge of the blade 43 and a roller 46 rotatably mounted adjacent thereto.

In order to vary the length of the periods of operation of the cutting blade, the driving ratio between the mechanism 42 and the roller 32 may be varied by varying the effective driving ratio of the chain 41 associated therewith.

While this form of rotary cutting mechanism has been illustrated for the purpose of obtaining a simplified disclosure, it is to be understood that any suitable form of cutting mechanism may be employed. One of the many examples of such cutting mechanism consists of a tension wire projecting through a slot between a pair of metallic guides which might be operated by any suitable mechanism such as pneumatic cylinders connected at the opposite ends thereof, the operation of which would be controlled by any suitable timing mechanism such as cams, electric, or pneumatic timing devices, etc.

The strip 29 thus is divided into slabs 47 of predetermined length which fall upon an inclined and arcuate roller conveying mechanism 48, from which they are projected into a tank 49 containing water or other cooling medium in which soapstone or other anti-friction material is suspended. A wire basket 52, positioned within the tank 49, receives the slabs 47 which are stacked thereupon successively. The opposite ends of the basket 49 are open, as indicated by Fig. 2, in order to facilitate the removal of the slabs therefrom. When the basket is full, it is elevated from the tank 49 by a hoist 53, which is removably mounted upon an eye beam track 54. The track 54 and hoist 53 may be employed to serve a plurality of mills equipped with such plastic material removing apparatus.

In the embodiment of the invention disclosed by Figs. 3 and 4, a plurality of mills 10 are employed in battery formation. Each of the mills of the battery is provided with a cutting blade 23 and a marking roller 26 mounted thereon, as indicated by Fig. 5. Each of the mills also is provided with a cooperating pair of driven conveyors 56, 57, etc. for any number of mills employed in the battery. Each of the cooperating pairs of conveyors is arranged relative to the mills 10, in a manner similar to the arrangement of the conveyors 33 and 36 illustrated by Fig. 1. Therefore, the numerals 33 and 36 are employed to designate the corresponding conveyors of these pairs. The conveyors 56, 57, etc., each are provided with a series of rollers 61, 62, etc., which is composed of oppositely disposed pairs of rollers adapted to receive a strip of plastic material from the discharge ends thereof. The rollers below the uppermost pair are progressively disposed at constantly increasing angles, the lower pair being disposed at an angle of approximately 90° thereto.

A strip of plastic material 29, received from any of the conveyors 56, 57, etc. will be twisted at an angle of approximately 90° by the rollers and discharged upon the upper reach of a driven conveyor 66, disposed beneath the discharge ends of all of the sets of rollers 61, 62, etc. An elevating conveyor 67, driven by the conveyor 66 through a chain 68 and disposed at an inclination relative to the conveyor 66, is adapted to receive such strip of material from the latter and transport it to a point above the second floor of a building in which the apparatus is located. The strip is discharged at the opposite end of the conveyor 67, upon a conveyor 69, which is mounted in a tank 71 adapted to be filled with water or other cooling fluid having soapstone or other anti-friction material in suspension therein. The conveyor 69 is driven from the conveyor 67 by a chain 72. At the opposite end of the conveyor 69, the strip 29 engages a series of rollers 73 disposed at an inclination to the conveyor and is elevated over the edge of the tank 71 and projected into engagement with a roller 74, which is driven from the conveyor 69 by a chain 76. Thence, the strip slides across the upper surface of a platform 77 into engagement with the upper reach of a conveyor 78.

A rotary cutting mechanism 79, mounted above the platform 77 and driven by a chain 84 from the conveyor 69, is provided with a knife 82 secured adjustably therein by a plurality of screws 83, which is adapted to sever the strip 29 into slabs of predetermined length by its periodic engagement with the strip upon the platform. The conveyor 78, which in turn is driven by a chain 86 from the cutting mechanism 79, transports the slabs beyond the cutting mechanism where they are removed by an attendant and placed upon the slab transporting trucks hereinbefore referred to.

When this form of apparatus is employed, the mills composing the battery are provided with batches of stock successively at such intervals that each batch can be removed before the mixing period for the succeeding one has expired. Thus, the strips 29 of plastic material will be supplied to each of the conveyors 56, 57, etc. and discharged therefrom upon the conveyor 67 in succession. Hence, each succeeding strip comprising a complete mill batch will be transported through the cooling and soapstoning liquid in the tank 71 and divided into predetermined lengths by the cutting mechanism 79.

It is to be understood that the several elements composing the apparatus embodying the preferred forms of the invention described in this specification are not limited to employment in any particular relation to each other. It may be advantageous and desirable to employ only a portion of the entire apparatus upon mills either separately or in battery formation. For example, any number of mills might be equipped with any form of marking disc or roller similar to that illustrated in the specification for marking the stock as it is being removed manually or such rollers might be employed as a tool independent of the mill for marking such stock after it has been removed.

Having set forth in detail the nature of the preferred forms of the invention, its scope is defined as follows:

1. Plastic material preparing apparatus comprising, in combination, a mill for kneading plastic material, a rotatable disc having indicia projecting therefrom tangently engaging a sheet of plastic material supported by a roll of the mill, a tank for containing liquid, means for moving the material from the mill to the tank, and movable means within the tank for supporting the material therein.

2. The combination with a mill for kneading plastic material, of a rotatable disc having indicia projecting therefrom tangently engaging a sheet of plastic material supported by a roll of the mill, means for varying the position of the disc relative to the mill roll and means for severing the sheet of plastic material into lengths.

3. The combination with a mill for kneading plastic material, of a blade for severing a strip of plastic material from a mill roll and a rotatable disc having indicia projecting from the surface thereof for marking a series of figures upon the strip progressively, a tank for containing liquid, means for moving the material directly from the mill to the tank, and movable means within the tank for supporting the material therein.

4. The combination with a mill for kneading plastic material, of a blade for severing a continuous strip of plastic material from a roll of the mill, a conveyor for transporting the strip from the mill, means for dividing it into predetermined lengths, a tank for containing a liquid into which the slabs are received from the last mentioned means and a movable platform within the tank for supporting the slabs therein.

5. The combination with a mill for kneading plastic material, of a blade for severing a continuous strip of plastic material from a roll of the mill, a conveyor for transporting the strip from the mill, means for dividing it into predetermined lengths, a tank for containing a liquid into which the slabs are received from the last mentioned means, a movable platform within the tank for supporting the slabs therein, and means for elevating the aforesaid platform.

6. The combination with a mill for kneading plastic material, of a blade for severing a continuous strip of plastic material from a roll of the mill, a conveyor for transporting the strip from the mill, means for dividing it into predetermined lengths, a tank for containing a liquid into which the slabs are received from the last mentioned means, a fabricated basket within the tank for supporting the slabs therein and means for elevating the basket.

In witness whereof, I have hereunto signed my name.

Signed at Akron, in the county of Summit and State of Ohio, U. S. A., this 27th day of November, 1928.

WILLIAM E. MacMONAGLE.